United States Patent [19]

MacRae

[11] 4,200,040
[45] Apr. 29, 1980

[54] POSITIONING, HOLDING AND LIFTING DEVICE

[76] Inventor: Brian P. MacRae, 925 Beach Rd., Apt. 408, Sarasota, Fla. 33581

[21] Appl. No.: 23,018

[22] Filed: Mar. 22, 1979

[51] Int. Cl.² .............................................. A47J 37/04
[52] U.S. Cl. ...................................... 99/426; D7/103; 99/449; 211/181; 224/45 W; 248/175; 294/1 R
[58] Field of Search ........................ D7/103, 130, 132; 99/426, 449; 224/45 W, 49; 294/1 R, 27 H, 32, 33; 248/175; 211/181

[56] References Cited

U.S. PATENT DOCUMENTS

| 1,263,863 | 4/1918 | Crosby | 99/449 |
|---|---|---|---|
| 2,297,332 | 9/1942 | Stewart | 294/1 R |
| 2,503,795 | 4/1950 | Brown | 99/449 X |
| 2,514,098 | 7/1950 | Shreiner | 99/426 |
| 2,593,077 | 4/1952 | Vogt | 99/426 X |
| 2,973,218 | 2/1961 | Schaum | 99/449 X |
| 3,075,798 | 1/1963 | Smith | 99/449 X |
| 3,194,460 | 7/1965 | Tupper | 294/32 X |
| 3,359,889 | 12/1967 | Young | 99/426 |
| 3,613,552 | 10/1971 | Kean | 99/426 |
| 3,934,772 | 1/1976 | Brannan | 224/45 W |

Primary Examiner—Billy J. Wilhite
Attorney, Agent, or Firm—Arthur W. Fisher, III; John Orman

[57] ABSTRACT

A positioning, lifting and holding device primarily designed to position large fowl such as turkeys or other roast or like food products in a cooking pan or like cooking facility wherein the positioning device is disposed in supporting relation to the food product so as to further facilitate its easy entry into a cooking pan and removal therefrom before and after the cooking process respectively.

11 Claims, 7 Drawing Figures

FIG. 6
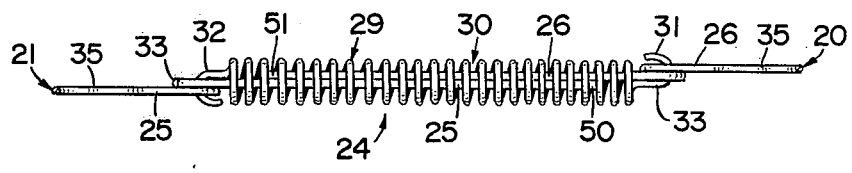
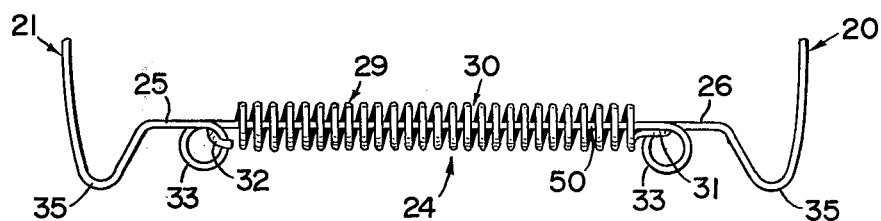
FIG. 7

POSITIONING, HOLDING AND LIFTING DEVICE

BACKGROUND OF THE INVENTION

1. Field of the Invention

This invention relates to a positioning and holding device designed to be used with food products such as fowl, roast, etc. and configured and dimensioned for supporting engagement with the food product and further structured to engage the food product in such a manner as to facilitate particularly the removal of the super heated food product from a cooking pan or like facility immediately after the cooking process has been completed.

2. Description of the Prior Art

In the cooking and preparation of large roast and fowl such as turkey, a problem well recognized is the inability to readily position the food product during the cooking process and further positioning the food product within a cooking pan and removing it therefrom after the cooking process has essentially been completed. Such manipulation of roast and large fowl is generally accomplished by the use of large forks or the like. Usage of utensils of this type is generally unsatisfactory due to the difficulty in positioning, removing or placing the food product with efficiency as well as the obvious damage done to the roast or fowl thereby deleting from the appearance thereof.

Commonly used methods of manipulating a roast, turkey or the like are well recognized as being undersirable or inefficient and potentially hazardous, in that the average housewife in such cases frequently finds it necessary to grasp the meat directly with the hands or with implements not suited for the purpose in order to turn the meat or remove it from the cooking pan or other like facility. However, this procedure is so cumbersome, even with the assistance of a second person, as to create the danger of burns from superheated fat and juices in the cooking pan as well as from damage to the cooked fowl or other roast. Naturally, insulation is reuired to prevent burning of the hands through the use of padded gloves or towels or dish cloths, etc. The obvious disadvantage is in the soiling of the material utilized frequently beyond repair.

In order to overcome this problem various devices exist in the prior art which are intended for the support, positioning, maintenance and/or transporting of large roast, fowl, etc. to and from the cooking facility before and after the cooking process as well as during the cooking process. Such prior art devices are disclosed generally in the following U.S. Pat. Nos.: Shreiner, 2,514,098; Vogt, 2,593,077; Schaum, 2,973,218; Young, 3,359,889; Kean, 3,613,552.

While the above devices are generally representative workable mechanisms, devices of this type frequently themselves include inherent problems due primarily to their inefficiency, overly complicated structure or inability to adapt to food products of various sizes and types.

Accordingly, there is still a need in the particular art for a lifting and positioning device capable of handling food products including roast, hams, turkeys, or like fowl of varying sizes and configurations in a manner which will be safe, effective and efficient in positioning the food product during the cooking process as well as placement of the food product into the cooking facility or pan and removal therefrom before and after the cooking process respectively.

SUMMARY OF THE INVENTION

This invention relates to a food product positioning and supporting device of the type used primarily to support, hold, lift and position large fowl such as turkeys, etc, roast, and like relatively large products during the cooking process.

More specifically the positioning device comprises holding means including at least two holding elements each having a first and second leg means dimensioned and configured for at least partial surrounding of the food product being cooked and further being disposed in supporting relation thereto. Each of the first and second leg means has integrally or otherwise attached thereto an elongated base element, so as to define a base means of each of the holding elements. Each of the base elements are disposed in side by side movable relation to one another, wherein a connector means is disposed in substantially surrounding relation to both of the base elements in a manner so as to allow relative movement therebetween. Accordingly, the base means, through movement of the base elements may be adjustable for proper positioning and supporting engagement, generally, on the under surface of the food product being cooked. A biasing means in the form of a spring element is interconnected at its opposite ends to each of the base elements of each of the first and second leg means. Biasing means is so disposed so as to normally bias the first and second leg means towards one another. However, due to the disposition and expandable nature of the spring element the base means is allowed to expand in length along its longitudinal axis to facilitate the support of food products of varying sizes.

Support means are integrally or otherwise attached to the holding elements and disposed to extend downwardly from the base means such that the base means is spaced apart from any supporting surface on which the entire positioning device is placed. This in turn spaces the under surface of the food product being cooked in spaced relation to a cooking pan or other supporting surface on which the supported food product and supporting positioning device is placed.

The opposite portion of each holding element is at least partially defined by a junction in turn defined by the interconnection of the first and second leg means at their respective ends substantially oppositely disposed to the area of location of the base elements. The handle means may comprise a handle element movably secured to each of the holding elements and positionable into cooperative relation to one another such that each of the holding elements may be simultaneously lifted thereby providing adequate, balance support to the entire food product being cooked in turn which allows effective removal or placement of the food product being cooked relative to and from the cooking facility which may be defined as a cooking pan or the like.

Each of the holding elements are disposed in spaced apart relation to one another in the area of their base means so that the under surface of the food product may be supported and engaged in balanced properly supporting relation thereto, and may be spaced in relation to each other in conformance to the longitudinal dimensions of the food product being cooked. The upper or oppositely disposed portions of each of the holding elements are positioned in substantially overlapping or what may be considered telescoping relation to one another so as to facilitate grasping of the individual handle elements or the handle means and the entire removal of the food product maintained in supported and properly positioned relation on or within the positioning device of the present invention.

The invention accordingly comprises the features of construction, combination of elements, and arrangement of parts which will exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 6 is a top view in partial cutaway of another embodiment of the present invention.

FIG. 7 is a side view of the embodiment of FIG. 6 in partial cutaway.

Similar reference characters refer to similar throughout the several views of the drawings.

DETAILED DESCRIPTION OF THE PREFERRED EMBODIMENT

Figure 1:
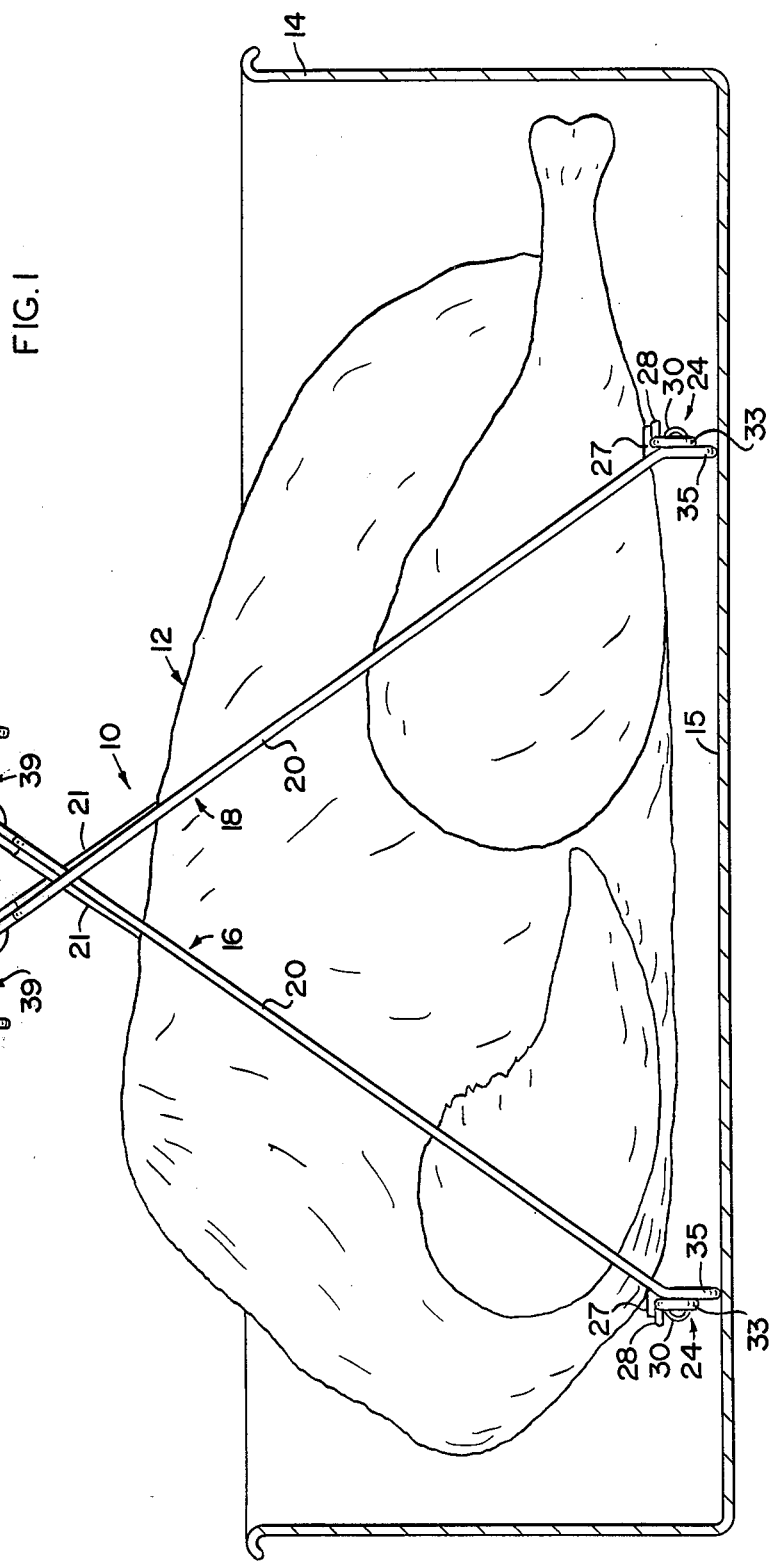
FIG. 1 is a side view in partial section showing the positioning device mounted on a food product.
Figure 2:
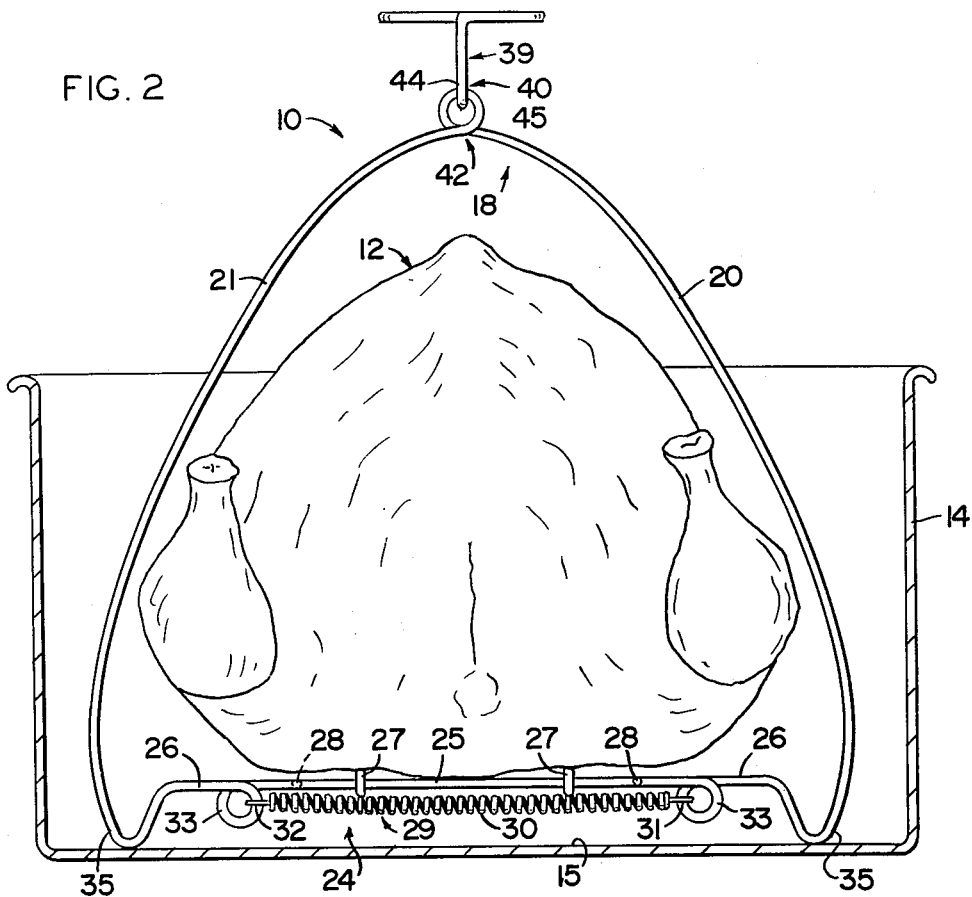
FIG. 2 is an end view in partical section of the embodiment of FIG. 1.

As shown in FIGS. 1 and 2 the positioning, and lifting device generally indicated as 10 is designed to support and position a food product generally indicated as 12 such as a large fowl, turkey or the like, roast, or like food product. More particularly the positioning device 10 is designed to position the food product 12 within a cooking facility such as a cooking pan or like element 14. To facilitate proper cooking of the food product 12 it is positioned in substantially spaced apart relation to the supporting surface 15 of the cooking pan 14 in a manner which will be explained in greater detail hereinafter.

The positioning device itself comprises holding means including at least two holding elements generally indicated as 16 and 18. For purposes of clarity the specific structural components of each of the holding elements 16 and 18 will be described with specific reference to a single one of such holding elements and as best shown in FIG. 2 as holding element 18.

Figure 3:
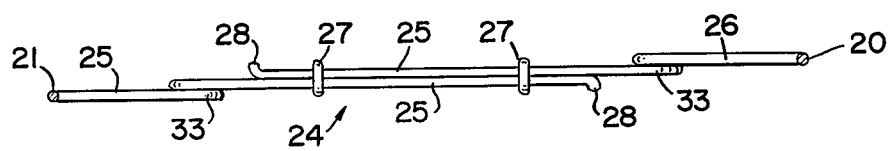
FIG. 3 is a detailed view in partial section showing the base means of the positioning device of the present invention.

More specifically each of the holding elements of the subject positioning device includes a first leg means 20 and a second leg means 21. The holding elements 16 and 18 each comprise a base means generally indicated in FIGS. 1, 2 and 3 as 24. Each of the base means 24 is at least partially defined by one base element 25 and 26 (FIG. 3) integrally or otherwise attached to the leg means 20 and 21 respectively. As shown in the subject drawings each of the base elements 25 and 26 has a substantially elongated configuration and are slidably interconnected to one another through the provision of connector means 27. The connector means 27 are crimped about the base elements 25 and 26 in a manner to allow sliding movement relative thereto. In one embodiment of the present invention the crimped connector means 27 are movable at least relative to one of the base elements 25 and 26 and fixedly attached to the other thereof. In order to prevent disengagement of either of the base elements 25 and 26 from the connector means and thereby prevent disengagement of the base elements 25 and 26 from one another, the ends of each of the base elements 25 and 26 are defined by stop means 28. The stop means 28 are disposed in outwardly projecting relation to the longitudinal axis of the respective base elements 25 and 26 and disposed in potentially interruptive relation to the connector means 27. Accordingly, even though sliding movement of the base elements 25 and 26 relative to one another along their own longitudinal axis is permitted the stop means 28 will interruptively engage the connector means 27 when the base elements 25 and 26 extend to their maximum outward extension. This interruptive engagement will prevent the connector means 27 from sliding beyond the length of either of the base elements 25 and 26 and maintain sliding engagement therebetween.

Figure 4:
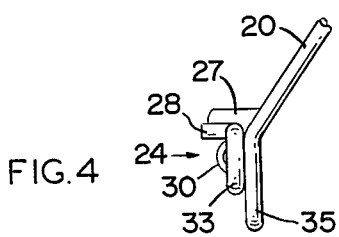
FIG. 4 is a detailed view in partical cutaway showing an end view of the base means.
Figure 5:
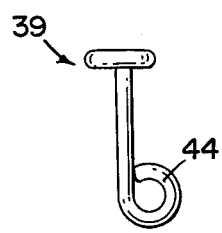
FIG. 5 is a detailed view of the handle means of the positioning device of the present invention.

A biasing means generally indicated as 29 comprises a spring element 30 having its opposite ends 31 and 32 interconnected to each of the base elements 25 and 26 through mounting elements 33. Interconnection of the biasing means 29 in the manner set forth above normally bias the legs 20 and 21 towards one another and serves to further maintain the base elements 25 and 26 into sliding engagement with on another. However, the longitudinal extension of the base means through relative movement of the base elements 25 and 26 is still allowed so as to be adjustably positioned in supporting relation to the food products 12 of any practical given size and/or configuration. Supporting means 35 are also integrally or otherwise attached to the first and second leg means 20 and 21 and depend substantially downwardly (as represented in the position of the positioning means in FIG. 2) from the base means 24. This provides the spaced apart relation of the base means and the supported food product 12 from the supporting surface 15 of the cooking facility or cooking pan 14. With reference to FIGS. 1 and 4, both of the leg means 20 and 21 of each of the holding elements 16 and 18 are disposed to extend angularly outward from the plane substantially defined by the supporting means 35 and back towards the opposite of the holding elements 16 and 18. This particular angular disposition is intended to accomplish overlapping engagement of the upper portions of the holding elements as at 38 (FIG. 1). Accordingly, handle means comprising a handle element 39 is movably attached as at 40 to each of the holding elements 16 and 18. A movable attachment occurs at the junction 42 (FIG. 2) of the joined ends of the leg means 20 and 21. A connecting loop (FIG. 5) 44 is disposed in a movable engagement with mounting loop 45 formed at the junction 42 of the first and second leg means 20 and 21. Accordingly, the handle element 39 is movable in a pivotal manner as indicated by directional arrows 46 so as to be disposed in cooperative relation and/or engagement with one another to facilitate the lifting of the entire food product 12 as it is supported in balanced, relation on the base means 24 each of the holding elements 16 and 18.

Accordingly, as can readily be seen the positioning means of the subject invention is structured to engage the food product 12 in a balanced and properly supported manner to facilitate positioning of the food product 12 and/or its entry into or removal from the cooking facility 14 in the manner shown in the drawings.

With respect to the embodiment of FIGS. 6 and 7 a different structure is provided wherein stop means 28 and connector elements 27 are eliminated. In this embodiment, the free end 50 and 52 of each base element 25 and 26 respectively include free ends 50 and 52 disposed within biasing means 29 including spring element 30. Base elements 25 and 26 are still movably or slidably positioned relative to one another so as to accommodate the substantially transverse dimension of the food product being cooked.

What is claimed is:

1. A positioning device of the type primarily designed for orienting, lifting and positioning fowl and roast type food products during cooking, said positioning device comprising: holding means including at least two holding elements disposed at least in part in spaced apart relation to one another and in supporting relation to the food product being cooked, each of said holding elements including a base means including movably adjustable components for direct support engagement with the food product, each base means of said respective holding elements disposed in spaced apart relation to one another, whereby the food product is supported by and balanced between said base means, handle means attached to said holding means in a substantially oppositely disposed relation to said base means, for transporting of the food product to and from a cooking vessel.

2. A positioning device as in claim 1 wherein each of said holding elements are configured to at least partially surround the food product and further being disposed in at least partially overlapping relation to one another substantially adjacent the area of said handle means and substantially oppositely located relative to said base means.

3. A positioning device as in claim 1 wherein each of said holding elements comprises at least a first and second leg means each including a base element attached thereto, each base element cooperatively positioned relative to one another to at least partially define said base means, one of said base elements movable relative to the other of said cooperatively positioned base elements to define adjustable support for at least a portion of the food product.

4. A positioning device as in claims 3 wherein each of said base elements comprises a substantially elongated configuration and is disposed in substantially parallel, side by side relation to one another, connector means disposed in substantially surrounding, containing relation to said base element and attached for sliding engagement with at least one of said base elements.

5. A positioning device as in claim 4 further comprising biasing means interconnected to each of said base elements and disposed to normally bias said base elements toward one another, said biasing means, said connector means and each of said base elements relatively disposed so as to accomplish adjustment of longitudinal dimension of said base means.

6. A positioning device as in claim 5 wherein said biasing means comprises a spring element having its opposite ends connected to one of said cooperatively positioned base elements.

7. A positioning device as in claim 3 wherein both said first and second leg means of each holding element are configured to extend angularly away from said respective base element attached thereto and toward and in substantially overlapping relation to the first and second leg means of the other of said at least two holding elements.

8. A positioning device as in claim 7 wherein each of said first and second leg means of each holding element are connected to one another at a junction defined by respective ends of each of said first and second leg means oppositely disposed to said base elements, said handle means defining a handle element secured to each of said holding elements at said junction of respective first and second leg means.

9. A positioning device as in claim 1 wherein each of said holding elements includes a support means integrally formed on said respective first and second leg means and depending downwardly from said base means, so as to dispose said holding means in spaced apart relation from any supporting surface on which said positioning device is placed.

10. A positioning device as in claim 4 further comprising stop means affixed to a free end of each of said base elements and disposed to extend outwardly from the longitudinal axis therefrom into potentially interruptive relation to said connector means, whereby disengagement of said connector means from said base elements is prevented.

11. A positioning device as in claim 3 further comprising biasing means interconnected to each of said base elements and disposed to normally bias said base elements toward one another, said biasing means including an elongated, substantially hollow spring element wherein each free end of each base element is slidably mounted relative to one another on the interior of said spring element.

* * * * *